(12) United States Patent
Eguchi

(10) Patent No.: US 12,031,879 B2
(45) Date of Patent: *Jul. 9, 2024

(54) ABERRATION ESTIMATING METHOD, ABERRATION ESTIMATING APPARATUS, AND STORAGE MEDIUM

(71) Applicant: CANON KABUSHIKI KAISHA, Tokyo (JP)

(72) Inventor: Akira Eguchi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/858,138

(22) Filed: Jul. 6, 2022

(65) Prior Publication Data

US 2022/0349777 A1 Nov. 3, 2022

Related U.S. Application Data

(63) Continuation of application No. 16/593,100, filed on Oct. 4, 2019, now Pat. No. 11,408,800.

(30) Foreign Application Priority Data

Oct. 11, 2018 (JP) .................................. 2018-192555

(51) Int. Cl.
*G01M 11/02* (2006.01)

(52) U.S. Cl.
CPC .............................. *G01M 11/0257* (2013.01)

(58) Field of Classification Search
CPC .... G03F 9/7069; G03F 7/706; G03F 7/70133; G03F 7/70591; G03F 7/70883; G03F 7/70758; G01N 21/47; G01N 21/94; G01J 9/00; G01M 11/0257; G01M 11/0214; G01M 11/0242; G02B 27/005; G06T 5/003; G06T 2207/10004; H04N 5/217; H04N 5/2173; H04N 5/2171; H04N 5/23212; G06K 9/36

USPC ................ 356/124–128, 512, 515, 521, 498; 355/52–67; 382/167; 348/242

See application file for complete search history.

(56) References Cited

U.S. PATENT DOCUMENTS

| | | |
|---|---|---|
| 6,831,766 B2 | 12/2004 | Sasaki |
| 7,345,767 B2 | 3/2008 | Amaya |

(Continued)

FOREIGN PATENT DOCUMENTS

| | | | |
|---|---|---|---|
| DE | 102015107517 B3 | * | 6/2016 |
| JP | 2000294488 A | | 10/2000 |

(Continued)

OTHER PUBLICATIONS

Office Action issued in Japanese Appln. No. 2018-192555 dated Sep. 6, 2022. English translation provided.

(Continued)

*Primary Examiner* — Hoa Q Pham
(74) *Attorney, Agent, or Firm* — ROSSI, KIMMS & McDOWELL LLP

(57) ABSTRACT

An aberration estimating method includes acquiring a light intensity distribution of an optical image of an object formed via a target optical system, acquiring an approximated aberration of the target optical system based on the light intensity distribution, determining an initial value of the aberration of the target optical system based on the approximated aberration, and estimating an aberration of the target optical system using the initial value.

12 Claims, 5 Drawing Sheets

(56) References Cited

U.S. PATENT DOCUMENTS

| | | | |
|---|---|---|---|
| 9,228,921 | B2 | 1/2016 | Yamazoe |
| 11,408,800 | B2 * | 8/2022 | Eguchi ............... G01M 11/0257 |
| 2010/0245842 | A1 | 9/2010 | Kato |
| 2010/0271636 | A1 | 10/2010 | Naoi |
| 2012/0026477 | A1 | 2/2012 | Rooijakkers |
| 2013/0157202 | A1 | 6/2013 | Kohara |
| 2013/0308018 | A1 | 11/2013 | Sasaki |
| 2014/0293275 | A1 | 10/2014 | Kato |
| 2016/0275656 | A1 | 9/2016 | Watanabe |

FOREIGN PATENT DOCUMENTS

| | | | |
|---|---|---|---|
| JP | 4411395 | B2 | 2/2010 |
| JP | 2010190885 | A | 9/2010 |
| JP | 2014190705 | A | 10/2014 |
| JP | 2017146189 | A | 8/2017 |
| WO | 2014171256 | A1 | 10/2014 |

OTHER PUBLICATIONS

Woods "Wave-front sensing by use of a Green's function solution to the intensity transport equation" Journal of the Optical Society America A. Mar. 2003: 508-512. vol. 20, No. 3. Cited in the specification.

Non-Final Office Action issued in U.S. Appl. No. 16/593,100 dated Nov. 12, 2020.

Final Office Action issued in U.S. Appl. No. 16/593,100 dated Apr. 16, 2021.

Non-Final Office Action issued in U.S. Appl. No. 16/593,100 dated Aug. 25, 2021.

Notice of Allowance issued in U.S. Appl. No. 16/593,100 dated Apr. 13, 2022.

* cited by examiner

ABERRATION ESTIMATING METHOD, ABERRATION ESTIMATING APPARATUS, AND STORAGE MEDIUM

BACKGROUND OF THE INVENTION

Field of the Invention

The present invention relates to an aberration estimating method, an aberration estimating apparatus, and a storage medium, each of which can estimate an aberration of an optical system using a light intensity distribution.

Description of the Related Art

An optical apparatus, such as a camera and a telescope, measures an aberration of an optical system, such as a lens, in order to evaluate and guarantee the performance of the optical apparatus. The aberration measurement needs to measure a phase of light, and thus conventionally uses an interferometer, a Shack-Hartmann sensor, or the like. However, these measurement apparatuses require a dedicated optical module, and are thus expensive and large.

Japanese Patent No. ("JP") 4411395 and Simon C. Woods, Alan H. Greenaway, "Wavefront sensing by use of a Green's function solution to the intensity transport equation", Journal of the Optical Society America A, U.S.A., March 2003, Vol. 20, pp. 508 ("Woods et al.") discloses a method for estimating an aberration by performing post-processing based on a light intensity distribution. The method of JP 4411395 estimates the aberration through an optimization calculation of a plurality of intensity measurement results. In addition, the method disclosed in Woods et al. calculates the aberration by solving the transport of intensity equation (TIE) from the two intensity measurement values.

However, the method of Japanese Patent No. 4411395 has a problem in that the result estimated by the initial value at which optimization starts significantly varies. The method disclosed in Woods et al. does not use repetitive calculations and does not have the above problem, but cannot provide a measurement with high accuracy due to an approximation error in solving the equation. Both methods lower the accuracy due to an apparatus error, a measurement error, or the like.

SUMMARY OF THE INVENTION

The present invention provides an aberration estimation method, an aberration estimating apparatus, and a storage medium, each of which can estimate an aberration of a target optical system with high accuracy.

An aberration estimating method according to one aspect of the present invention includes acquiring a light intensity distribution of an optical image of an object formed via a target optical system, acquiring an approximated aberration of the target optical system based on the light intensity distribution, determining an initial value of the aberration of the target optical system based on the approximated aberration, and estimating an aberration of the target optical system using the initial value.

A non-transitory computer-readable storage medium storing a program for causing a computer to execute the above aberration estimating method also constitutes another aspect of the present invention.

An aberration estimating apparatus according to another aspect of the present invention includes an image sensor configured to acquire a light intensity distribution of an optical image of an object formed via a target optical system, and a controller configured to estimate an aberration of the target optical system based on the light intensity distribution. The controller acquires an approximated aberration of the target optical system based on the light intensity distribution, and determines an initial value of the aberration of the target optical system used in estimating the aberration of the target optical system based on the approximated aberration.

Further features of the present invention will become apparent from the following description of exemplary embodiments with reference to the attached drawings.

DESCRIPTION OF THE EMBODIMENTS

Figure 1:
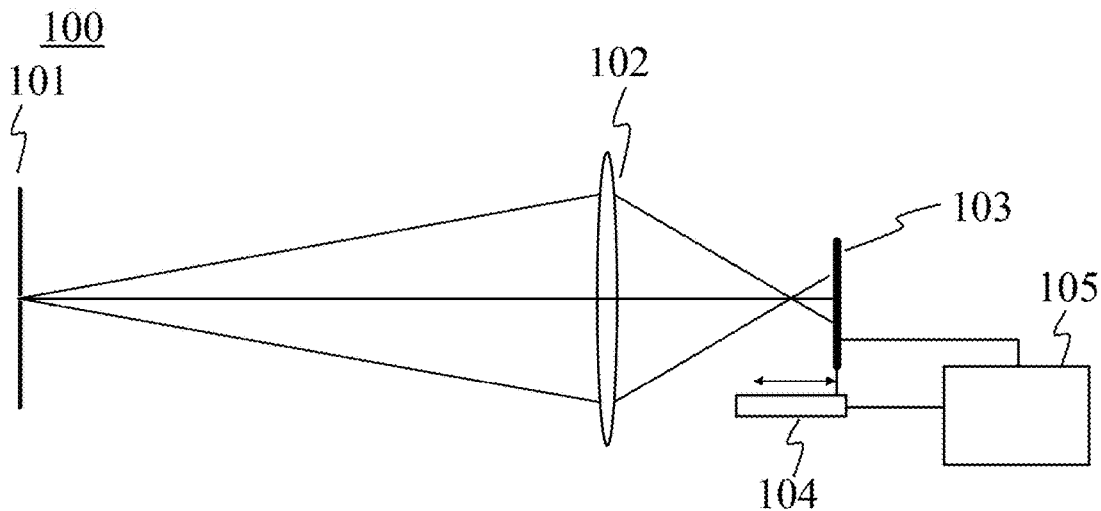
FIG. 1 is a schematic diagram of an aberration measuring apparatus according to one embodiment of the present invention.

Referring now to the accompanying drawings, a description will be given of embodiments according to the present invention. Corresponding elements in respective figures will be designated by the same reference numerals, and a description thereof will be omitted.

FIG. 1 is a schematic diagram of an aberration estimating apparatus 100 according to one embodiment of the present invention. A target optical system 102 (to be measured) images light emitted from a pinhole 101 and forms an optical image on an imaging plane of an image sensor 103. The image sensor 103 is installed on a driver 104. The driver 104 is controlled by a computer (controller) 105 and moves the image sensor 103 along the optical axis by a designated defocus amount. The image sensor 103 acquires a light intensity distribution of the optical image at each moved position, and stores the acquired light intensity distribution in the computer 105 or an unillustrated data storage. The computer 105 estimates the aberration of the target optical system 102 by post-processing a plurality of light intensity distributions. The post-processing may be executed by the computer 105 or may be executed by another calculator. A calculator in a cloud through a network may provide the post-processing.

The acquired aberration will be described as a wavefront aberration of the target optical system 102, but the aberration measurable by the present invention is not limited to this aberration. Once the wavefront aberration is acquired, a lateral aberration amount and a longitudinal aberration amount can be acquired by a simple calculation. A chromatic aberration can be measured by using a plurality of wavelengths. Furthermore, the Seidel aberration can be measured by developing the wavefront aberration with a Zernike polynomial.

One post-processing method executed by the computer 105 is, for example, an optimization. The optimization estimates the aberration by sequentially changing the aberration so as to minimize the evaluation. In order to reduce the calculation load, it is possible to develop the aberration with an appropriate function and perform the optimization using the coefficient as an optimization variable. An aberration developing function is, for example, a Zernike polynomial. The Zernike polynomial is suitable for the aberration developing function because the aberration type corresponds to the basis function.

Figure 2:
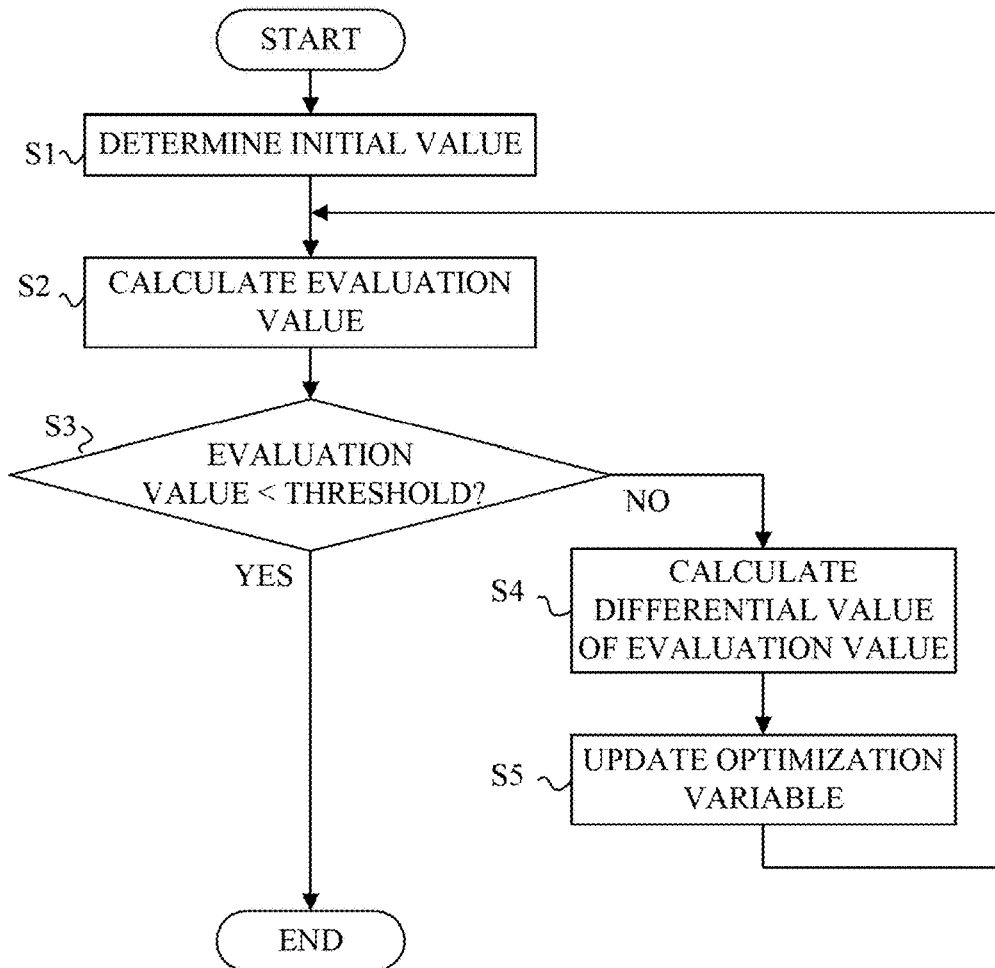
FIG. 2 is a flowchart of post-processing.

There are various methods for executing the optimization, such as the steepest descent method, the conjugate gradient method, or the quasi-Newton method. These methods are called gradient methods, and executed in accordance with the flowchart of FIG. 2. FIG. 2 is a flowchart of the post-processing. This embodiment discusses the computer 105 executing the post-processing.

In the step S1, the computer 105 determines an initial value of the optimization variable. When the aberration is developed with the Zernike polynomial, the initial value of the expansion coefficient may be determined.

In the step S2, the computer 105 calculates an evaluation value. The evaluation value may be obtained by calculating a residual sum of squares of the light intensity distribution calculated by a calculation from the acquired light intensity distribution and the estimated aberration.

In the step S3, the computer 105 determines whether or not the evaluation value calculated in the step S2 is smaller than a threshold. If the evaluation value is smaller than the threshold, the flow ends. If the evaluation value is larger than the threshold, the flow proceeds to the step S104. When the evaluation value is equal to the threshold, which step to proceed to can be arbitrarily set.

In the step S4, the computer 105 calculates a differential value of the evaluation value calculated in the step S2.

In the step S5, the computer 105 updates the optimization variable based on the differential value calculated in the step S4.

After the processing in the step S5, the evaluation value is again calculated in the step S2 using the newly obtained optimization variable. The above processing (processing from the step S2 to the step S5) is repeated until the evaluation value becomes smaller than the threshold in the step S3.

The above method enables the aberration of the target optical system 102 to be estimated based on the light intensity distribution. However, the estimation of the aberration by the optimization has a problem in that the estimation result significantly varies depending on the initial value.

Figure 3:
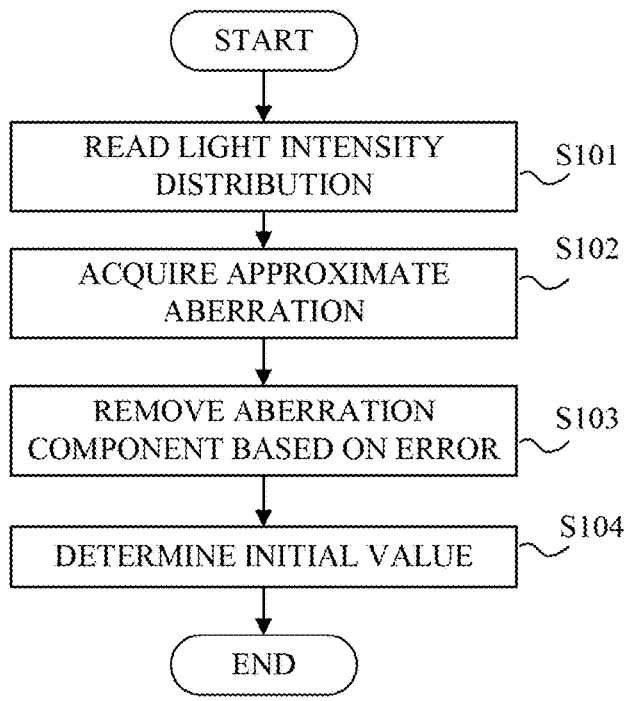
FIG. 3 is a flowchart of a method for determining an initial value.

The present invention thus determines the initial value at which the optimization properly works. FIG. 3 is a flowchart of a method for determining the initial value.

In the step S101, the computer 105 acquires a light intensity distribution. The light intensity distribution acquired in this step may be part of the already acquired light intensity distribution, or may be a result measured at a new defocus position.

In the step S102, the computer 105 acquires the approximated aberration. The approximated aberration is an aberration acquired from the light intensity distribution without executing a calculation with a large load such as a repetitive calculation and roughly reproduces an outline of the aberration of the target optical system. The method for acquiring the approximated aberration can use, for example, a method of solving the TIE and a method of using a result of machine learning.

In the step S103, the computer 105 removes an aberration component caused by a measurement error or a calculation error from the approximated aberration acquired in the step S102.

In the step S104, the computer 105 determines an initial value using the aberration from which the aberration component caused by the error has been removed.

Figure 4:
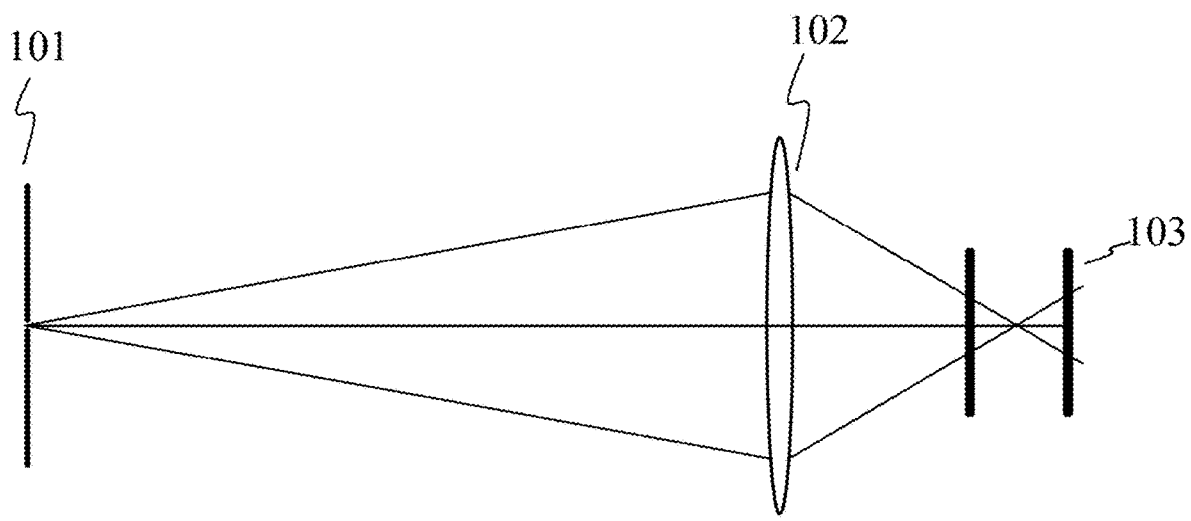
FIG. 4 explains a method for obtaining an approximated aberration using a transport of intensity equation (TIE).

A detailed description will now be given of a method for acquiring the approximated aberration in the step S102. One illustrative acquisition method is a method for solving the TIE. FIG. 4 is a diagram for explaining an approximated aberration acquiring method utilizing the TIE. As illustrated in FIG. 4, the method of solving the TIE first uses for the calculation light intensity distributions measured at two positions that are relatively far away from the focus position in a positive and negative symmetry. The defocus amount is thus made larger because the light intensity distribution of the optical image is closer to the light intensity distribution in the pupil space as the defocus amount becomes larger and the light intensity distribution in the image space can be approximately measured. Next, the TIE is solved based on the measurement results. The TIE is expressed by the following expression (1):

$$\nabla_\perp \cdot I(x, y; z_0) \nabla_\perp \phi(x, y; z_0) = -\frac{2\pi}{\lambda} \frac{\partial I(x, y, z)}{\partial z}\bigg|_{z=z_0} \quad (1)$$

Here, $\nabla_\perp$ is a differential operator in the x and y directions, x and y express an orthogonal coordinate on a plane perpendicular to the optical axis, z is a coordinate in the optical axis direction, $z_0$ is a measurement position, and $I(x, y, z)$ and $\phi(x, y, z)$ are the light intensity distribution and phase distribution on the plane perpendicular to the optical axis at the position z, respectively, and $\lambda$ is a wavelength. The phase in the pupil space can be calculated by solving this equation. In particular, the defocus positions symmetric with respect to positive and negative correspond to the measurements at positions symmetric with respect to the pupil plane in the pupil space, and thus the calculation result is a phase distribution on the pupil plane or the aberration. At this time, $z_0$ corresponds to the pupil position. A differentiation of z on the right side can be approximated by a difference value between two intensity measurement values, and the intensity distribution on the left side can be approximated by an average value of the two intensity measurement values. There are various solving methods for the differentiated equation, and for example, it can be solved by developing a phase distribution and a light intensity distribution in an orthogonal function system. At this time, the calculation load can be reduced by selecting a function that is easy to handle, such as a Fourier basis, as the orthogonal function system.

As described above, the approximated aberration of the target optical system can be acquired without repetitive calculations, but there is a problem in using the obtained result as an initial value for the optimization, because the approximated aberration has an error due to the measurement or calculation processing. For example, the light intensity distribution read in the step S101 may contain an error in the defocus amount. An error in the defocus amount is caused by a discordance between the origin of the driving stage and the focus position, a discordance between the defocus amount instructed by the computer 105 and the physical distance from the focus position, or the like. In that case, the approximated aberration contains an error in the defocus component. The defocus component of the approximated aberration is an aberration in which the aberration amount increases approximately in proportion to the square of the distance from the pupil center, and corresponds to the fourth term in the Fringe Zernike polynomial.

An error occurs when the center of the light intensity distribution used for the calculation shifts from the optical axis. This shift will be referred to as an image shift, and the shift amount will be referred to as an image shift amount. If the defocus amount is large, the image widely spreads. Thus, it is not easy to determine the position of the optical axis, and an error occurs in determining the position. Since the driver 104 is not placed parallel to the optical axis, the optical image is likely to move laterally with driving. Due to the image shift caused by these factors, the obtained approximated aberration has an error in the image shift component.

Errors caused by dirt and dust on the lens also occur. Even if the approximated aberration is acquired by a method other than the TIE, the error is inevitable because the focus shift and the image shift are caused by the measurement and data processing.

Even if no error occurs in the apparatus or measurement, other errors occur due to various approximations in obtaining the approximated aberration. In particular, since a method that uses no repetitive calculations is suitable in obtaining the approximated aberration, a method that contains many approximations must be inevitably selected. The method of solving the TIE has an error due to the differentiation in the optical axis direction approximated to the difference, the intensity distribution in the image space regarded as the intensity distribution in the pupil space, and the like.

Accordingly, the present invention determines an initial value using an aberration obtained by removing an aberration component caused by a measurement error or a calculation error from the acquired approximated aberration. In particular, the image shift component and the defocus component, which are low-order aberrations among aberrations, is likely to cause an error due to errors in the apparatus, measurement, or calculation, and greatly contributes to the evaluation value. Thus, the optimization accuracy can be improved by setting to the initial value the aberration obtained by removing the image shift component and the defocus component from the approximated aberration.

As described above, this embodiment can estimate with high accuracy by determining an initial value based on a whole or part of an aberration obtained by removing an aberration component caused by an aberration other than the aberration of the optical system from the approximated aberration.

This embodiment can be mathematically modeled and can be implemented as a software function in a computer system. The software function in the computer system includes programming (program) including an executable code. The software code can be executed on a general purpose computer. During the software code operation, the code or associated data record is stored in the general purpose computer platform. In other cases, however, the software is stored in another location or loaded into a suitable general purpose computer system. Thus, the software code can be stored in at least one machine-readable medium (storage medium) as one or more modules.

A detailed description will be given of embodiments of the present invention.

First Embodiment

Figure 5:
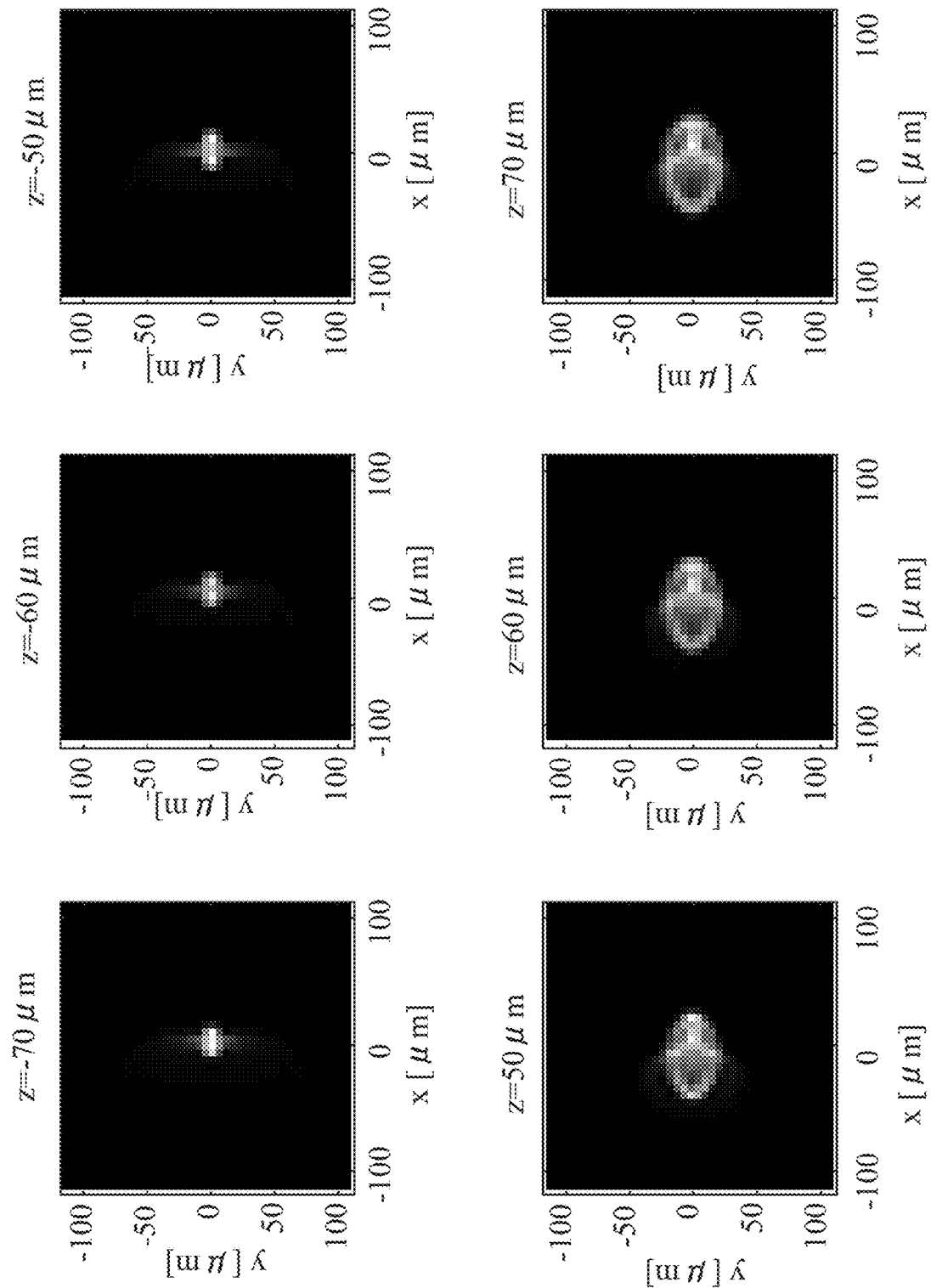
FIG. 5 illustrates a light intensity distribution used for the post-processing according to a first embodiment.

A description will now be given through simulation of an aberration estimating method according to a first embodiment. This embodiment is realized by the aberration estimating apparatus 100 in FIG. 1. The image sensor 103 is installed on the driver 104 and moves to a position designated by the computer 105. In this embodiment, the light intensity distribution is acquired at each position where the focus position of the target optical system 102 is set to the origin and the defocus amounts are set to $-70$ μm, $-60$ μm, $-50$ μm, $50$ μm, $60$ μm, and $70$ μm. It is assumed that the pinhole 101 is located at a sufficiently long distance, and light incident on the target optical system 102 is substantially parallel light. Assume that the target optical system 102 has an F-number of 1.4, and an aberration in which the coefficient of the fifth term in the Zernike polynomial is $-2\lambda$, the coefficient of the seventh term is $4\lambda$, and the coefficient of the ninth term is $2\lambda$. There are various definitions of the Zernike polynomial, but this embodiment refers to the fringe Zernike polynomial as the Zernike polynomial. Assume that the measurement wavelength is 632.8 nm, and the image sensor 103 has a pixel size of 5.5 μm. FIG. 5 illustrates light intensity distributions used for the post-processing according to this embodiment, and acquired under the above conditions. The computer 105 uses them to estimate the aberration according to the flowchart of FIG. 2.

Figure 6:
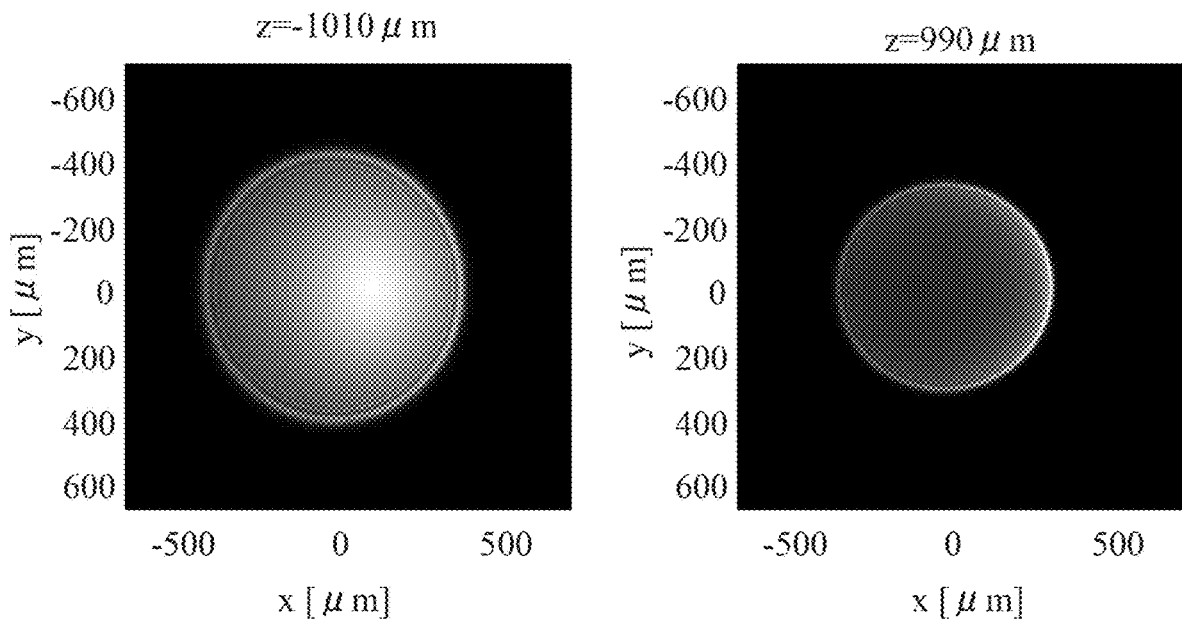
FIG. 6 illustrates a light intensity distribution used to obtain an approximated aberration according to the first embodiment.

In order to determine the initial value in the step S1, this embodiment acquires the light intensity distribution at each position where the defocus amounts are $-1010$ μm and $990$ μm. FIG. 6 illustrates light intensity distributions used to obtain the approximated aberration according to this embodiment. Since the approximated aberration is acquired using the TIE, this embodiment provides a large defocus amount such that the image substantially reproduces the pupil shape. Although it is necessary to extract data for calculations from the acquired light intensity distribution, it is not easy to determine the position of the optical axis from the thus spreading image and an image may be shifted by the extraction. In particular, since the light intensity distribution has shifted from the optical axis in the negative x-axis direction due to the influence of the aberration, it is easily presumed that the data extraction center shifts from the optical axis in the negative x-direction. This embodiment extracts the data around a point (x, y)=($-33$ μm, $-5.5$ μm) which is approximately the center of the image.

Figure 7:
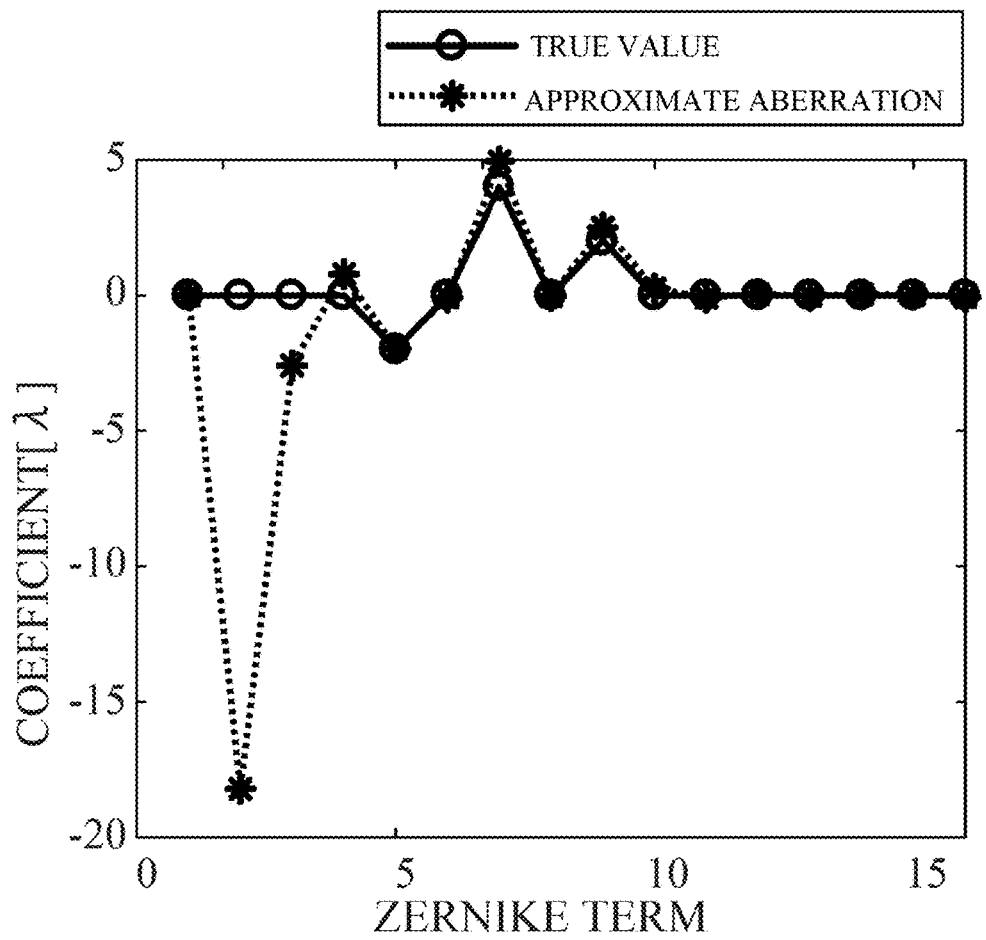
FIG. 7 illustrates the approximated aberration acquired in the first embodiment.

FIG. 7 illustrates the approximated aberration acquired by the TIE based on the extracted data. The TIE is solved by the orthogonal function expansion using the Fourier basis, and the Zernike fitting is performed for the obtained result. The obtained approximated aberration has a large error in the second and third terms. These errors are caused by the determination error of the center position of data or aberration components caused by the image shift. The error in the fourth term is an aberration component caused by the focus origin shift. Accordingly, this embodiment sets the coefficients of the first to fourth terms to 0, and uses the fifth and subsequent terms as the initial values of the optimization variables. Based on the obtained initial value, the operations following the step S2 are executed.

The evaluation value calculated in the step S2 uses the residual sum of squares between the measured light intensity distribution and the light intensity distribution obtained by the calculation from the aberration estimated in each iteration. The optimization variable in the step S5 is updated using the Levenberg-Marquardt method. The calculation is completed when twenty repetitions are completed.

Figure 8:
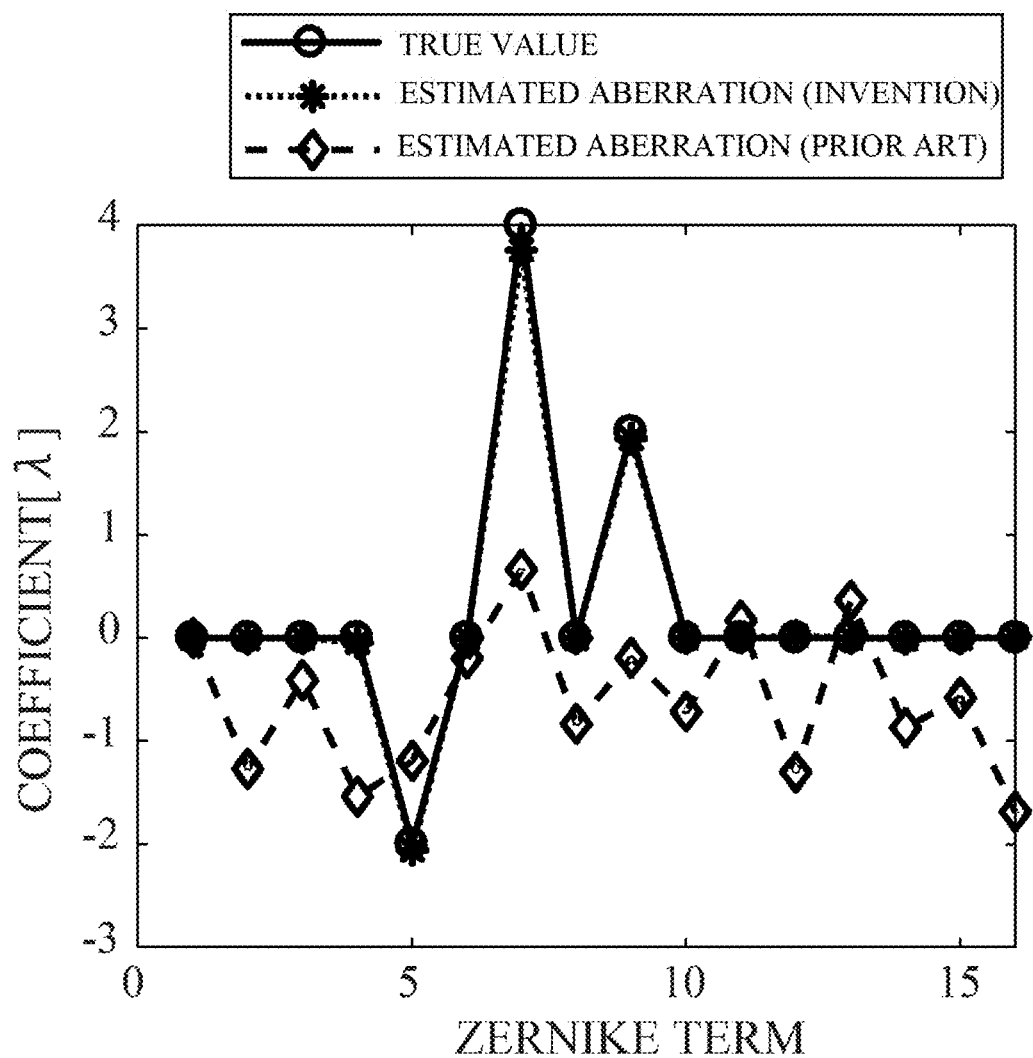
FIG. 8 illustrates an estimated aberration according to the first embodiment.

FIG. 8 illustrates the estimated aberration. The estimated aberration indicated by the dotted line almost reproduces the true value indicated by the solid line, indicating that the aberration was estimated with high accuracy. On the other hand, it can be seen that the aberration estimated using the conventional optimization method using no aberration indicated by the broken line for the initial value does not reproduce the true value at all, and the estimation fails. From the above results, it is understood that the present invention can provide the aberration estimation with high accuracy.

This embodiment removes the aberration caused by the image shift and the focus shift from the approximated aberration obtained by the TIE. In addition to the aberration caused by image shift and focus shift, an error also occurs due to dust or scratches adhered to the optical system or image sensor surface, for example. It is thus important to remove these aberrations. For example, it is possible to reduce the error by dividing a specific pattern from the approximated aberration or by removing a specific area. In addition, it is possible to reduce the error caused by the sensor noise by multiplying by a function that reduces a higher order component in the Zernike polynomial. In any method, the purport of the present invention is to determine the initial value from part of the approximated aberration, and the method is not limited. Since the image shift and focus shift are highly likely to occur in the measurement and the degree of influence on the evaluation value is also high, one embodiment in the present invention may eliminate the aberration caused by them.

This embodiment acquires the approximated aberration by solving the TIE from a plurality of defocused images. One method of acquiring the approximated aberration from a defocused image is a method of acquiring the approximated aberration using machine learning. Regardless of which method is used, the purport of the present invention is to determine the initial value from part of the aberration in which an error component is removed from the approximated aberration obtained from the defocused image, and the method of acquiring the approximated aberration is not limited. Since the method of solving the TIE can use the orthogonal function expansion and fast Fourier transform, it can be advantageously processed at a high speed even without a high-performance computing environment. Hence, this is a suitable method as an acquisition method of the approximated aberration.

This embodiment has described the optimization using a gradient method as an illustrative post-processing method. Another post-processing method is a method of repeating the Fourier transform described in Japanese Patent Laid-Open No. 2000-294488. Even the method of repeating the Fourier transform needs the initial value, and the method shown in this embodiment is effective. However, the optimization enables the user to arbitrarily select the variable to be estimated and thus advantageously provides the accelerated calculation by devising such as reducing the variable to be estimated. Since the user can arbitrarily select which evaluation amount is to be optimized as an evaluation value, the estimation accuracy can be improved by selecting a suitable function where the object spreads. Due to this advantage, the optimization may be used for the post-processing method.

In addition to the light intensity distribution used for the post-processing, this embodiment uses two newly acquired light intensity distributions to determine the initial value, but the already acquired light intensity distribution may be used. For example, the TIE may be solved using two of a plurality of light intensity distributions used for the post-processing. One may be selected from the previously acquired light intensity distributions and the other may be newly acquired. It is not particularly limited which light intensity distribution is used to determine the initial value or for post-processing.

The light intensity distribution used to obtain the approximated aberration is not necessarily limited to two. This embodiment approximates the differential value of z in the TIE with two light intensity distributions, but the differential approximation can be performed using three or more light intensity distributions. In this case, since the approximation accuracy is improved, an approximated aberration closer to the true aberration can be obtained. In any method, it is the purport of the present invention to obtain the approximated aberration from at least one light intensity distribution, and the number is not limited.

This embodiment uses the Zernike polynomial as a function to develop the aberration, but the present invention is not limited to this embodiment. The aberration component caused by the image shift is a linear component, and can be removed by linearly fitting the aberration. Since the defocus component corresponds to a quadratic function, it can be similarly removed by fitting. The aberration caused by the error can be removed regardless of the function for developing the aberration.

The optimization variable is not limited to the coefficient of the Zernike polynomial. When the pupil shape is close to an ellipse due to light shielding or the like in the optical system, an elliptical Zernike function is applicable. A function system for developing the aberration and an optimization variable corresponding to the function system may be appropriately determined in accordance with the pupil shape or the assumed shape of the aberration. The aberration amount at each point on the pupil can be set to the optimization variable.

The target driven by the driver 104 is not limited to the image sensor 103. By changing the focus arrangement of the optical system, the same effect can be obtained as long as the intensity distribution of the optical image given the defocus can be acquired. For example, the target optical system 102 may be moved, or the pinhole 101 may be moved. An optical system for changing the focus may be used, or a phase modulation corresponding to changing the focus may be applied using a spatial light modulator.

This embodiment forms an optical image using the pinhole 101 as an object, but the present invention is not limited to this embodiment. The same effect can be obtained by using the object whose light intensity distribution is condensed on a minute area on the image plane by the target optical system 102. For example, the same effect can be obtained even if a general illumination light source located far away or a celestial body observed with a telescope or the like is used as the light source. A parallel plane wave emitted from a laser or the like corresponds to the object placed at infinity, and this light may enter the target optical system 102. Even when the pinhole 101 is used, the size of the opening may be finite.

The above embodiment can provide an aberration estimating method, an aberration estimating apparatus, and a storage medium, each of which can accurately estimate the aberration of the target optical system only from the intensity measurement result.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-192555, filed on Oct. 11, 2018, which is hereby incorporated by reference herein in its entirety.

What is claimed is:

1. An apparatus for evaluating performance of a target optical system, the apparatus comprising:
    an image sensor configured to acquire a light intensity distribution of an optical image of an object formed via the target optical system; and
    at least one processor or circuit configured to execute instructions to:
        acquire a plurality of light intensity distributions at a plurality of defocus positions of the target optical system from the image sensor;
        acquire an approximated aberration of the target optical system based on the plurality of light intensity distributions;
        correct the approximated aberration by reducing at least one of:
            a defocus component of the approximated aberration, the defocus component including an error due to measurement or calculation of the light intensity distribution; or
            a shift component of the approximated aberration, the shift component including an error due to shifting of a center of the light intensity distribution from an optical axis of the target optical system; and
        estimate an aberration for evaluating the target optical system by an optimization calculation performed using at least part of the corrected approximated aberration as an initial value and the plurality of light intensity distributions.

2. The apparatus according to claim 1, wherein the at least one processor or circuit calculates the approximated aberration using a transport of intensity equation.

3. The apparatus according to claim 1, wherein:
    the at least one processor or circuit, in the optimization calculation, estimates the aberration of the target optical system by comparing an evaluation value with a threshold of the evaluation value, and
    the evaluation value is acquired using the light intensity distribution and the approximated aberration of the target optical system.

4. The apparatus according to claim 3, wherein the at least one processor or circuit updates the evaluation value in accordance a differential value of the evaluation value.

5. The apparatus according to claim 1, wherein at least one of the light intensity distributions used during estimating the aberration includes a light intensity distribution acquired at a defocus position closer to a focus position of the target optical system than the defocus position used when the approximated aberration is acquired.

6. A method of estimating an aberration of a target optical system for evaluating performance of the target optical system, the method comprising:
    acquiring, using an image sensor, a light intensity distribution of an optical image of an object formed via the target optical system;
    acquiring, using a controller, an approximated aberration of the target optical system based on the acquired light intensity distribution from the image sensor;
    determining using the controller, an initial value of the aberration of the target optical system based on an aberration obtained by removing an image shift component and a defocus component from the approximated aberration; and
    estimating, using the controller, the aberration of the target optical system using the initial value.

7. A method of estimating an aberration of a target optical system for evaluating performance of the target optical system, the method comprising:
    acquiring, using an image sensor, a plurality of light intensity distributions of an optical image of an object formed via the target optical system at a plurality of defocus positions;
    acquiring, using a controller, an approximated aberration of the target optical system using a transport of intensity equation based on the plurality of light intensity distributions;
    determining, using the controller, an initial value of the aberration of the target optical system based on the approximated aberration; and
    estimating, using the controller, the aberration of the target optical system using the plurality of light intensity distributions and the initial value.

8. The method according to claim 7, wherein:
    the acquired approximated aberration is corrected by reducing at least one of:
        a defocus component of the approximated aberration, the defocus component including an error due to measurement or calculation of the light intensity distribution; or
        a shift component of the approximated aberration, the shift component including an error due to shifting of a center of the light intensity distribution from an optical axis of the target optical system; and
    when estimating the aberration, an aberration for evaluating the target optical system is estimated by an optimization calculation performed using at least part of the corrected approximated aberration as an initial value and the plurality of light intensity distributions.

9. The method according to claim 8, wherein, when estimating the aberration, the approximated aberration is corrected and the aberration for evaluating the target optical system is estimated by an optimization calculation performed using at least part of the corrected approximated aberration as the initial value and the plurality of light intensity distributions.

10. The method according to claim 9, wherein, when estimating the aberration, the evaluation value is updated in accordance a differential value of the evaluation value.

11. An apparatus for evaluating performance of a target optical system, the apparatus comprising:
    an image sensor configured to acquire a light intensity distribution of an optical image of an object formed via the target optical system; and
    at least one processor or circuit configured to execute instructions to:
        acquire an approximated aberration of the target optical system based on the acquired light intensity distribution from the image sensor;
        correct the approximated aberration by reducing at least one of:
            a defocus component of the approximated aberration, the defocus component including an error due to measurement or calculation of the light intensity distribution; or
            a shift component of the approximated aberration, the shift component including an error due to shifting of a center of the light intensity distribution from an optical axis of the target optical system; and
        estimate an aberration for evaluating the target optical system by an optimization calculation using at least part of the corrected approximated aberration as an initial value,
    wherein the at least one processor or circuit, in the optimization calculation, estimates the aberration of the target optical system by comparing an evaluation value with a threshold of the evaluation value, and
    wherein the evaluation value is acquired using the light intensity distribution and the approximated aberration of the target optical system.

12. The apparatus according to claim 11, wherein the at least one processor or circuit updates the evaluation value in accordance a differential value of the evaluation value.

* * * * *